INVENTORS.
Harry G. Boynton,
Everett W. Lewis,
BY Albert T. Watson,

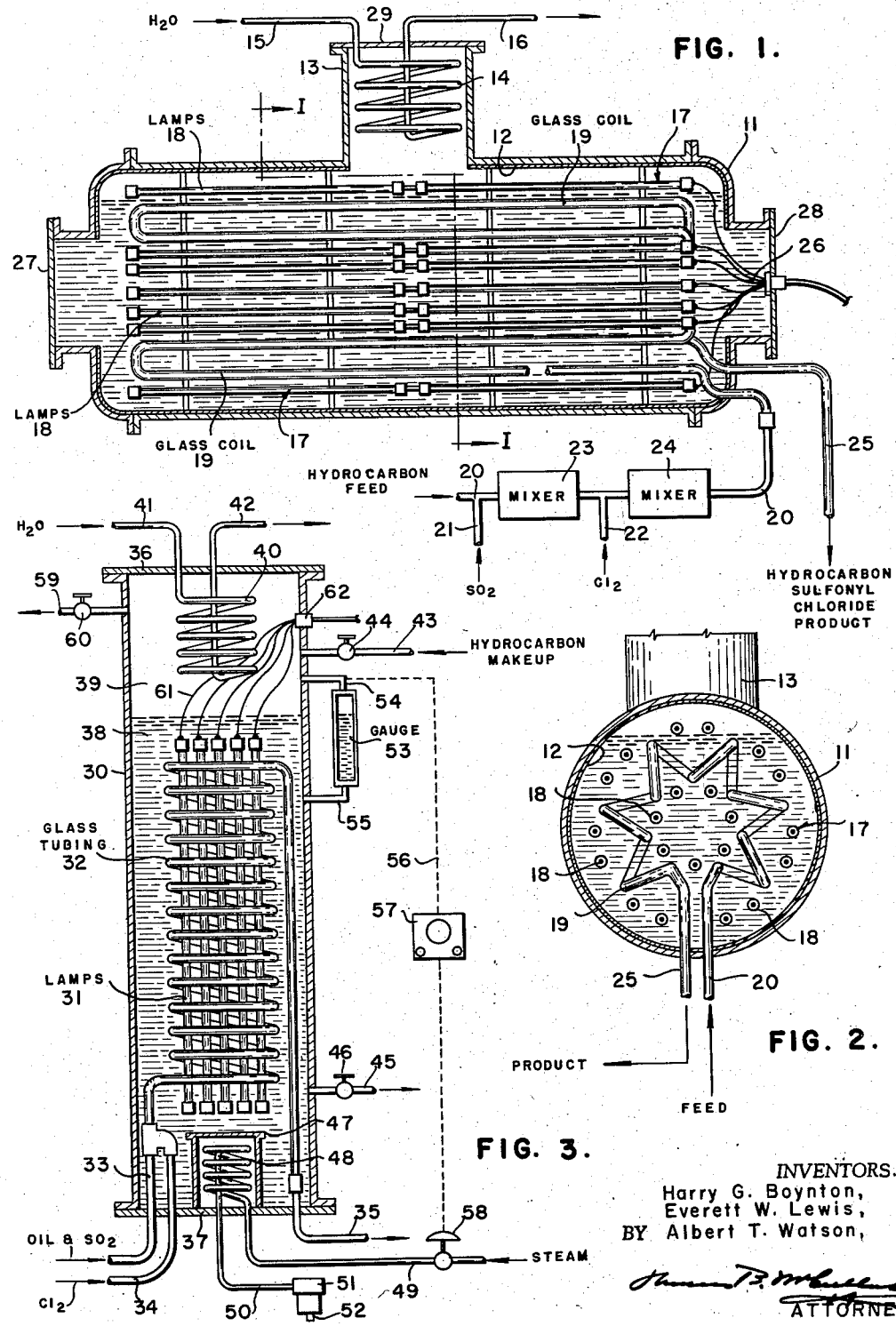

ATTORNEY.

United States Patent Office 2,890,990
Patented June 16, 1959

2,890,990

METHOD FOR CONDUCTING PHOTOCHEMICAL REACTIONS

Harry G. Boynton, Everett W. Lewis, and Albert T. Watson, Baytown, Tex., assignors, by mesne assignments, to Esso Research and Engineering Company, Elizabeth, N.J., a corporation of Delaware Original application October 20, 1955, Serial No. 541,599, now Patent No. 2,848,623, dated August 19, 1958. Divided and this application November 6, 1957, Serial No. 694,880

8 Claims. (Cl. 204—162)

The present invention is directed to a method for reacting chemicals photochemically. More specifically, the invention is directed to a method for conducting photochemical reactions at high pressures. In its more specific aspects, the invention is concerned with a method for reacting hydrocarbons at high pressures in a novel reaction zone.

This application is a divisional application of Serial No. 541,599, filed October 20, 1955, now Patent No. 2,848,-623, for Harry G. Boynton, Everett W. Lewis and Albert T. Watson, entitled "Method for Conducting Photochemical Reactions and Apparatus Therefor."

The present invention may be briefly described as a reactor vessel for photochemical reactions which comprises a vessel adapted to contain a liquid body of a vaporizable refrigerant and provided with means for introducing vaporizable refrigerant to and withdrawing vaporizable refrigerant from said vessel. Arranged in said vessel are a plurality of photochemical lamps. A glass reaction coil or one suitably made of material transparent to light is arranged in the vessel in proximity to the lamps to describe a path through said vessel. The vessel is provided in its upper part with means for condensing refrigerant. Means are provided for introducing reactants into the said coil and means are provided for withdrawing product from said coil.

The invention also includes a method for reacting hydrocarbons and the like under high pressures wherein a mixture, for example, of sulfur dioxide and hydrocarbons is reacted in a glass reaction zone under high pressures. The glass reaction zone is immersed in a liquid pool of a vaporizable, normally gaseous hydrocarbon and the mixture is then exposed in said immersed reaction zone to radiations of a sufficient wave length at a selected pressure at least as great as the safe-working pressure of the reaction zone. The pool is maintained during exposure in the vaporizable hydrocarbon which has a vapor pressure corresponding to the selected pressure.

The photochemical lamps employed in the practice of the present invention may suitably be mercury vapor lamps and may be lamps such as described in the patent to Roberts et al. U.S. 2,528,320, issued October 31, 1950. Other photochemical lamps, such as well known in the art, may be employed. Lamps such as described in the patent to Henke et al. U.S. 2,333,568, issued November 2, 1943, may also be used. These lamps provide radiation of a suitable wave length in the range from 3000 to 5800 A.

The refrigerant or the vaporizable, normally gaseous hydrocarbon may be ethane, propane, butane, and the like, as well as other vaporizable refrigerants such as those of the Freon type. Other refrigerants which will meet the characteristics of being transparent to radiation of the wave length required for initiating photochemical reactions, volatilizable and readily liquefiable may suitably be used.

The reaction conditions employed in the practice of the present invention may encompass temperatures in the range from about 0° to about 300° F. Temperatures of about 150° F. may give satisfactory results. Pressures suitably may range from about 25 pounds up to about 300 pounds per square inch gauge.

The reaction zone is suitably a vessel in which is provided a bank of lamps or a plurality of banks of lamps of the type mentioned supra. A glass coil reaction tube is arranged to describe a tortuous path through the vessel and the reaction coil is provided with an inlet for introducing reactants and an outlet for recovering product therefrom.

The upper portion of the reaction vessel, which may be in the form of a vapor dome, is suitably provided with or has connected thereto a condensing means for condensing the refrigerant which removes heat of reaction by vaporization of the refrigerant.

The hydrocarbons employed as reactants in the present invention may suitably be paraffinic and naphthenic hydrocarbons as exemplified by hexane, heptane, octane, nonane, and the higher members of the same homologous series. Hydrocarbons boiling in the naphtha, kerosene, gas oil and lubricating oil boiling range may also be used. Lubricating oils produced by solvent extraction of lubricating oil fractions are entirely suitable as feed stocks.

The naphthenic hydrocarbons, such as the single ring naphthenes, such as cyclohexane and the higher members of the same homologous series may also be used. Mixtures of naphthenic and paraffinic hydrocarbons may form the feed stock of the present invention. The white oil of commerce is a suitable feed stock.

The invention will be further illustrated by reference to the drawing in which:

Fig. 1 is a sectional view of one embodiment;

Fig. 2 is a view taken along the lines I—I of Fig. 1;

Fig. 3 is a modification of the embodiment of Fig. 1; and

Figure 4:
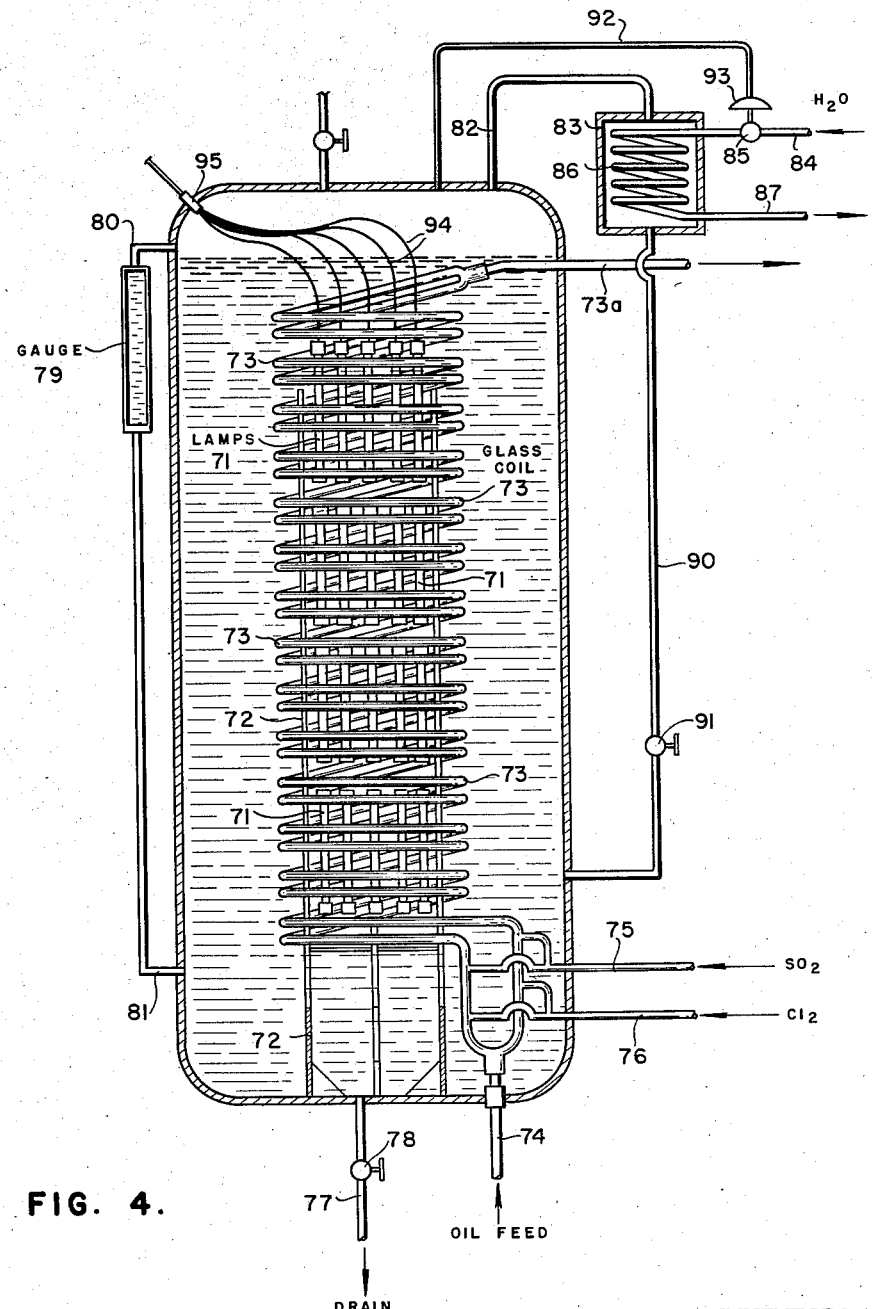
Fig. 4 is a view of a preferred embodiment.

Referring now to the drawing and particularly Figs. 1 and 2 in which identical numerals will be employed to designate identical parts, numeral 11 designates a horizontal, elongated reaction vessel suitably comprised of a steel shell which may be provided with an internal reflecting surface 12 which may be composed of a reflecting metal, such as stainless steel or aluminum, silver and the like.

The upper portion of the vessel 11 is in the form of a vapor dome 13 having a condensing coil 14 arranged therein through which water or other cooling medium may be circulated therethrough by inlet line 15 and outlet line 16.

The vessel 11 is provided with a bank 17 composed of a plurality of photochemical lamps 18 of the type mentioned supra. These lamps are spaced apart from each other and from the internal walls of the vessel 11. Arranged to describe a tortuous path through the bank 17 is a glass reaction coil 19, as shown more clearly in Fig. 1, into which reactants, such as hydrocarbons, may be introduced by way of line 20, sulfur dioxide by way of line 21 and chlorine by way of line 22. Line 20 is provided with mixing devices 23 and 24 which suitably may be baffle plate incorporators although other mixing devices, such as centrifugal pumps, mixing towers having internal vapor-liquid contacting means and the like may be used.

The glass coil 19 is provided with an outlet line 25 by way of which the photochemical reaction product, such as hydrocarbon sulfonyl chlorides, may be removed. The lamps 18 and bank 17 are suitably connected by electrical connecting means 26 to ballasts, starters, and voltage source, not shown, which are well known in the art.

It is to be noted that the vessel 11 is provided with manholes 27 and 28 for easy access thereto and the vapor dome 13 is also provided with a manhole 29 for ready access, the several manholes 27, 28 and 29 being suitably closed by bolted flanges.

Referring now to Fig. 3, a vertical, elongated reactor 30 is provided with a plurality of longitudinally extending lamps 31 of the type mentioned. Arranged to provide a flow path in proximity to the lamps is a reaction coil 32 of light transparent material into which oil and sulfur dioxide are introduced by way of line 33 and chlorine by line 34.

The products from the coil 32 are discharged therefrom by line 35 for further processing of the hydrocarbon sulfonyl chloride.

The reactor vessel 30 is closed on the upper and lower ends by bolted flanged heads 36 and 37.

Arranged in the vessel 30 is a body 38 of liquid refrigerant, such as liquefied butane and the like, which is arranged to cover the lamps 31 and the coils 32. Arranged in the vapor space 39 above the body 38 is a condensing means, such as a coil 40, through which water is circulated by way of lines 41 and 42.

The vessel 30 is provided with line 43 controlled by valve 44 for introduction of makeup refrigerant and with line 45 controlled by valve 46 for withdrawing the refrigerant.

The vessel 30 is provided with a steam chest 47 having a steam coil 48 arranged therein into which steam is introduced by line 49 and withdrawn by way of line 50 and steam trap 51 and discharged by line 52. Steam chest 47 allows regulation of temperature in the reaction zone.

The liquid level of refrigerant in vessel 30 may be indicated by a gauge glass 53 connected to the vessel 30 by lines 54 and 55.

Connected to line 54 and to vessel 30 by line 56 is a pressure recorder controller 57 which, in turn, connects to a valve 58 in line 49. This pressure recorder controller 57 serves to introduce and cut off steam into the coil 48 for maintenance of temperature in the vessel 30.

A vent line 59 controlled by valve 60 allows vapors to be vented from the space 39. Electrical leads 61 are carried through an electrically insulated bushing 62 through the wall of vessel 30 and connected to an electrical system, not shown.

Referring to Fig. 4, which is a modification of Fig. 3 and is a preferred embodiment, numeral 70 designates an elongated, vertical reaction vessel in accordance with the present invention having a plurality of longitudinally extending lamps 71 arranged therein at spaced apart intervals at a plurality of levels. Conveniently, 24 lamps may be arranged in banks at four levels in the vessel. These lamps may be centered equally on a 2 inch diameter circle and supported by a suitable frame member 72.

A light transparent coil, such as glass coil 73, is arranged around the lamps 71. The oil feed may be introduced by line 74, sulfur dioxide by line 75 and chlorine by line 76 into coil 73. Product is withdrawn from coil 73 by line 73a comprising hydrocarbon sulfonyl chloride. The vessel 70 is provided with a drain line 77 controlled by valve 78 and is provided with a gauge glass 79 connected to the vessel 70 by lines 80 and 81.

Connected to the upper end of the vessel 70 by line 82 is a condensing means 83 through which water is circulated by line 84, controlled by valve 85, through coil 86 and withdrawn by line 87. The condensed refrigerant is returned to vessel 70 by line 90 controlled by valve 91. The valve 85 in line 84 is connected to the upper end of the vessel 70 by line 92 through a diaphragm arrangement 93 which serves to control the valve 85 to regulate the flow of water through line 84. Electrical leads 94 connect to the lamps 71 and are carried to the exterior of the vessel through an electrically insulated bushing 95 to connect to an electrical power source, not shown.

The vessel 70 may be designed to operate at a temperature of about 200° F. and a pressure of 100 pounds per square inch gauge. A suitable reactor may have two 350 feet helical coils, such as 70, of 1½ inch double-tough Pyrex glass pipe supported on a suitable frame. Chlorine and sulfur dioxide may be injected separately into each coil while the hydrocarbon feed is split and fed into each coil.

The method and apparatus of the present invention is of considerable advantage in that heretofore it was impractical to carry out photochemical reactions at high pressures without providing expensive equipment, such as glass-lined vessels. In the present invention the disadvantages of the prior art are entirely obviated by providing an elongated, horizontal reaction vessel which has a glass coil constructed, for example, of double-tough Pyrex pipe arranged in the elongated vessel. By immersing the glass reaction tube in a steel vessel which may be designed to withstand pressure as high as 200 to 300 pounds per square inch, it is possible to operate the glass reaction zone at the higher pressures, although the Pyrex glass pipe has a safe-working pressure of only about 50 pounds per square inch gauge. By providing a liquid pool of refrigerant or vaporizable, normally gaseous hydrocarbon in the elongated reaction vessel and confining same therein, it is possible to operate in the glass reaction coil at a pressure in excess of the safe-working pressure of the glass reaction coil. In short, by maintaining a pressure on the exterior of the reaction tube equivalent to the pressure on the interior of the reaction tube, the pressure differential across the reaction tube is balanced and operations may be conducted at high pressures.

In operating the apparatus of the present invention, a reactant mixture, for example, of a paraffinic type lubricating oil, chlorine, and sulfur dioxide is introduced into a glass or light transparent reaction coil, such as 19, immersed in a reaction vessel, such as 11, in which a body or pool of liquid normal butane is maintained. The lamps, such as 18, are energized to provide light radiations of a suitable wave length which cause a reaction among the several reactants to provide hydrocarbon sulfonyl chlorides which are withdrawn as the product from coil 19 by line 25. The heat of reaction is removed by vaporization of the normal butane and the vaporized normal butane is condensed on contact with the coil 14 and caused to drop back in the pool which is thus maintained during the operation. Operations may suitably be conducted at a temperature of about 150° F. and a pressure of about 100 pounds which is in excess of the safe-working pressure of coil 19.

It is desirable that the refrigerant or liquefiable normally gaseous hydrocarbon have a vapor pressure equal to the pressure at which it is desired to operate. For example, in operations at about 150° F. and 100 pounds per square inch gauge, the steel vessel may be filled with normal butane which will have a vapor pressure of about 100 pounds per square inch at this temperature. The pressure of butane in a steel shell may be from 50 pounds per square inch gauge below to slightly above the reaction pressure inside the glass reaction tube. Any leakage into the reaction tube may not be detrimental since small amounts of the hydrocarbon refrigerant, such as butane, will not affect adversely the photochemical reaction and may be easily separated from the reactor product.

Another advantage of the present invention is that the hydrocarbon pool or bath of refrigerant serves to remove high heats of reaction from the photochemical reaction and thereby allows maintenance of close control of the reactor temperature. The heat of reaction is removed from the reactor by the vaporized hydrocarbons which is then condensed and this heat is removed from the system by the condensation of the vaporized hydrocarbon. Thus the pool or the liquid hydrocarbon level is maintained above the reaction tubes which are immersed therein.

It is desirable that the lamps be spaced around the glass tubing and spaced away from the outer shell of the steel vessel. Lamps should also be placed spaced away from each other in the center of the vessel so that the reaction coil describes a tortuous path through the banks of the lamps.

It is desirable to dry the hydrocarbon or refrigerant in which the bank is immersed in order to eliminate any difficulties by virtue of the electrical connections passing through the pool of refrigerant. The hydrocarbon or refrigerant selected will transmit substantially 100% of the light radiation of photochemical lamps. Butane and the other normally gaseous hydrocarbons possess this requirement.

As pointed out previously, in order to operate efficiently, it is desirable that the inner wall of the elongated vessel be coated with a light reflecting material, such as stainless steel, aluminum, silver, and the like.

It will be seen from the foregoing description taken with the drawing that we have provided a new and useful reaction vessel and method for operating same in preparing photochemical reactants.

The nature and objects of the present invention having been completely described and illustrated, what we wish to claim as new and useful and to secure by Letters Patent is:

1. A method for conducting photochemical reactions under high pressure in a closed reaction zone transparent to light which comprises exposing photochemical reactants in said reaction zone to radiations of a sufficient wave length at a selected pressure at least as great as the safe-working pressure of said zone to cause said reactants to undergo reaction while maintaining said reaction zone immersed in a confined body of a low boiling vaporizable compound having a vapor pressure corresponding to the selected pressure to remove heat of reaction.

2. A method in accordance with claim 1 in which the reactants are chlorine, sulfur dioxide, and hydrocarbons.

3. A method in accordance with claim 1 in which the vaporizable compound is butane.

4. A method for reacting a mixture of sulfur dioxide, chlorine and hydrocarbons in a closed glass reaction zone under high pressures which comprises immersing said reaction zone in a liquid pool of a vaporizable normally gaseous hydrocarbon, exposing said mixture in said immersed reaction zone to radiations of a sufficient wave length at a selected pressure at least as great as the safe-working pressure of said reaction zone, and maintaining said pool during said exposure to remove heat of reaction, said vaporizable hydrocarbon having a vapor pressure corresponding to the selected pressure.

5. A method in accordance with claim 4 in which the normally gaseous hydrocarbon is butane.

6. A method for conducting photochemical reactions under high pressure in a closed reaction zone transparent to light which comprises exposing photochemical reactants in said reaction zone to radiation of a sufficient wave length at a selected pressure at least as great as the safe working pressure of said zone to cause said reactants to undergo reaction in said reaction zone, and cooling said reaction zone by maintaining adjacent said reaction zone a confined liquid body of a low boiling vaporizable compound having a vapor pressure corresponding to the selected pressure to remove heat of reaction.

7. A method in accordance with claim 6 in which the reactants are chlorine, sulfur dioxide and hydrocarbons.

8. A method in accordance with claim 6 in which the vaporizable compound is butane.

References Cited in the file of this patent

UNITED STATES PATENTS

| | | |
|---|---|---|
| 1,286,135 | Somermeier | Nov. 26, 1918 |
| 2,528,320 | Roberts et al. | Oct. 31, 1950 |